United States Patent
Mecca et al.

(10) Patent No.: US 11,820,898 B2
(45) Date of Patent: Nov. 21, 2023

(54) POLYDIORGANOSILOXANE COMPOSITIONS AND METHODS FOR USE THEREOF IN FORMING WOOD PLASTIC COMPOSITES

(71) Applicant: Dow Silicones Corporation, Midland, MI (US)

(72) Inventors: Jodi Mecca, Midland, MI (US); James Keenihan, Midland, MI (US); Marc-Andre Courtemanche, Midland, MI (US); Keith Bruce, Midland, MI (US); Igor Chorvath, Midland, MI (US); Sean Gaal, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 18/052,711

(22) Filed: Nov. 4, 2022

(65) Prior Publication Data
US 2023/0102976 A1 Mar. 30, 2023

Related U.S. Application Data

(63) Continuation of application No. 17/613,144, filed as application No. PCT/US2020/036891 on Jun. 10, 2020.

(60) Provisional application No. 62/883,683, filed on Aug. 7, 2019.

(51) Int. Cl.
*C08L 97/02* (2006.01)
*C08L 23/08* (2006.01)

(52) U.S. Cl.
CPC ........... *C08L 97/02* (2013.01); *C08L 23/0869* (2013.01); *C08L 2205/03* (2013.01)

(58) Field of Classification Search
CPC ... C08L 97/02; C08L 23/0869; C08L 2205/03
USPC ........................................................ 524/14
See application file for complete search history.

(56) References Cited

U.S. PATENT DOCUMENTS

| | | |
|---|---|---|
| 3,645,992 A | 2/1972 | Elston |
| 4,076,698 A | 2/1978 | Anderson et al. |
| 4,535,113 A | 8/1985 | Foster et al. |
| 4,857,593 A | 8/1989 | Leung et al. |
| 4,925,890 A | 5/1990 | Leung et al. |
| 5,034,278 A | 7/1991 | Turbett |
| 5,272,236 A | 12/1993 | Lai et al. |
| 5,278,272 A | 1/1994 | Lai et al. |
| 5,356,585 A | 10/1994 | Romenesko |
| 5,543,189 A | 8/1996 | Nakakura et al. |
| 5,582,923 A | 12/1996 | Kale et al. |
| 5,708,084 A | 1/1998 | Hauenstein et al. |
| 5,708,085 A | 1/1998 | Hauenstein et al. |
| 5,789,473 A | 8/1998 | Hauenstein et al. |
| 6,013,217 A | 1/2000 | Hauenstein et al. |
| 6,569,931 B2 | 5/2003 | Furukawa et al. |
| 6,660,807 B2 | 12/2003 | Morita et al. |
| 6,743,507 B2 | 6/2004 | Barlow et al. |
| 7,897,689 B2 | 3/2011 | Harris et al. |
| 8,058,330 B2 | 11/2011 | Irie et al. |
| 8,722,773 B2 | 5/2014 | Hamilton et al. |
| 9,796,839 B2 | 10/2017 | Alric et al. |
| 2003/0114569 A1 | 6/2003 | Morita et al. |
| 2004/0204519 A1 | 10/2004 | Fender et al. |
| 2008/0027161 A1 | 1/2008 | Schlosser et al. |
| 2008/0058460 A1 | 3/2008 | Tonge et al. |
| 2008/0073627 A1 | 3/2008 | Goode et al. |
| 2008/0132654 A1 | 6/2008 | Ho et al. |
| 2009/0007818 A1 | 1/2009 | Militz et al. |
| 2009/0137716 A1 | 5/2009 | Furukawa et al. |
| 2015/0306018 A1 | 10/2015 | Clark et al. |
| 2019/0023895 A1 | 1/2019 | Harris et al. |

FOREIGN PATENT DOCUMENTS

| | | |
|---|---|---|
| CA | 2370051 | 10/2000 |
| CN | 101899181 | 12/2010 |
| CN | 102093735 | 6/2011 |
| CN | 103102589 | 5/2013 |
| CN | 103374194 | 10/2013 |
| CN | 103483838 | 1/2014 |
| CN | 104774368 | 7/2015 |
| CN | 105001508 | 10/2015 |
| CN | 105038283 | 11/2015 |
| CN | 105348835 | 2/2016 |
| CN | 105350741 | 2/2016 |
| CN | 106221220 | 12/2016 |
| CN | 106279922 | 1/2017 |
| EP | 0125020 | 11/1984 |
| EP | 600166 | 6/1994 |

(Continued)

OTHER PUBLICATIONS

Chemie., "Genioplast HDPE 20A03." Wacker Genioplast. Germany. 2016, p. 1-2.
Chemie., "Genioplast Pellet S. Polymer Additive." Wacker Genioplast. Germany. 2014, p. 1-2.
Chemie., "Wacker introduces additives for wood-plastic composites, bioplastics and more." Additives and Polymers. 2017, p. 5-6.
Gregorio., "Consumer Solution." 2018, p. 1-18.
Hristov., "Thermoplastic Silicone Elastomer Lubricant in Extrusion of Polypropylene Wood Flour Composites." Advances in Polymer Technology. 2007, p. 100-108, vol. 26, No. 2.

(Continued)

*Primary Examiner* — Ling Siu Choi
*Assistant Examiner* — Ronald Grinsted
(74) *Attorney, Agent, or Firm* — Catherine Brown

(57) ABSTRACT

A polydiorganosiloxane is useful in a composition and a method for preparing a wood plastic composite article. The wood plastic composite article is useful as a building material. The polydiorganosiloxane may be added to the composition in liquid form or may form part of a solid carrier component used to make the wood plastic composite article.

20 Claims, No Drawings

(56) References Cited

FOREIGN PATENT DOCUMENTS

| | | |
|---|---|---|
| EP | 722981 | 7/1996 |
| EP | 1211277 | 6/2002 |
| EP | 1554337 | 7/2005 |
| EP | 2872565 | 5/2015 |
| JP | H115911 | 6/1997 |
| JP | H115911 A * | 1/1999 |
| WO | 2007071732 | 6/2007 |
| WO | 2015024283 | 2/2015 |
| WO | 2015076970 | 5/2015 |
| WO | 2018/049555 | 3/2018 |

OTHER PUBLICATIONS

Khalid., "The Effectiveness of Polydimethylsiloxane (PDMS) and Hexamethyldisiloxane (HMDSO) as Compatibilizer on the Preparation of Betel Nut Fiber (BNF) and Polypropylene (PP) /Polystyrene (PS) Wood Composites." The Malaysian Journal of Analytical Sciences. Malaysia, 2014, p. 629-641.

Manual of Patent Examining Procedure, Ninth Edition, 2018, 2111.03 I., II., and III, pp. 130-132.

Pettersen, "The Chemical Composition of Wood", U.S. Department of Agriculture, Forest Service, Forest Products Laboratory, Chapter 2.

Standard Test Method for Density and Specific Gravity (Relative Density) of Plastics by Displacement. ASTM International. 2019, p. 1-6.

Standard Test Method for Transition Temperatures and Enthalpies of Fusion and Crystallization of Polymers by Differential Scanning Calorimetry. ASTM International. 2019, p. 1-7.

Stuktol TPW 104 Processing Additive. 2016, p. 1-2.

Baltimore, "The Effects of Various Additives on the Processing and Physical Properties of Wood-Filled PVC.", Baltimore. 2000, p. 1-26.

Tullo., "Introducing the New Dow." Petrochemicals. 2018, p. 1-4, vol. 96, issue 46.

Search Report from corresponding Chinese Application No. 202080054897.X dated Dec. 8, 2022.

\* cited by examiner

POLYDIORGANOSILOXANE COMPOSITIONS AND METHODS FOR USE THEREOF IN FORMING WOOD PLASTIC COMPOSITES

CROSS REFERENCE TO RELATED APPLICATIONS

This application is a Continuation, which claims priority under 35 U.S.C. §120 to, and all advantages of, U.S. patent application Ser. No. 17/613,144 filed on 10 Jun. 2020, which claims priority under 35 U.S.C. §371 to, and all advantages of, International Application No. PCT/US2020/036891 filed on 10 Jun. 2020, which claims the benefit of U.S. Provisional Patent Application No. 62/883683 filed 7 Aug. 2019 under 35 U.S.C. §119 (e). U.S. patent application Ser. No. 17/613,144; International Application No. PCT/US2020/036891; and U.S. Provisional Patent Application No. 62/883683 are hereby incorporated by reference.

TECHNICAL FIELD

A polydiorganosiloxane is useful in a wood plastic composite (WPC) composition and method for preparing WPC articles. The polydiorganosiloxane may be delivered in liquid or solid form.

BACKGROUND

Conventional processes for producing WPC articles generally require a process aid (which can be internal or external) to facilitate forming and ensure quality (e.g., smoothness of surface and edges) of the WPC articles. Conventional, low cost, organic process aids generally suffer from the drawback of requiring high loading to achieve faster production speeds, thereby impacting cost and/or performance. In addition, many conventional process aids may negatively affect physical properties and reduce mechanical properties (such as impact resistance, flexural strength, and flexural modulus) of the WPC articles, especially at elevated use temperatures. Conventional process aids may also migrate from the WPC articles, thus negatively impacting one or more properties of the WPC articles over time, such as physical properties, appearance, feel, ability to overmold, ability to co-extrude, ability to adhere to the surface, ability to print the surface or ability to paint the surface of the WPC articles. In addition, some of the organic process aids volatilize at higher application temperatures, which can lead to formation or bubbles and cracks in the WPC articles, which can compromise long term performance of these articles.

SUMMARY

A composition comprises: (a) a lignocellulosic-based filler; (b) an ethylene-based polymer; and (c) a polydiorganosiloxane of formula

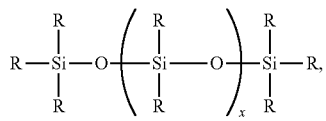

where each R is an independently selected monovalent hydrocarbon group of 1 to 18 carbon atoms that is free of aliphatic unsaturation, and subscript x has a value sufficient to give the polydiorganosiloxane a viscosity of >350 mPa·s to 100,000 mPa·s measured at 25° C. at 0.1 RPM to 50 RPM on a Brookfield DV-III cone & plate viscometer with #CP-52 spindle. A method for preparing a wood plastic composite article from the composition is also disclosed.

A solid carrier component comprises:
(i) the polydiorganosiloxane described above as starting material (c); and
(ii) a polymer component selected from the group consisting of:
  an ethylene-based polymer,
  a maleated ethylene-based polymer, and
  a combination of both the ethylene-based polymer and the maleated ethylene-based polymer. The solid carrier component may be useful for delivering the polydiorganosiloxane to the composition.

DETAILED DESCRIPTION

A composition is useful for preparing a wood plastic composite article. The composition comprises:
15 weight % to 70 weight % of (a) a lignocellulosic-based filler;
29.5 weight % to 84.5 weight % of (b) an ethylene-based polymer;
0.5 weight % to 6 weight % of (c) a polydiorganosiloxane of formula

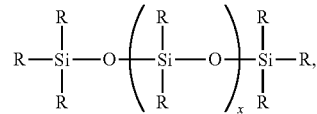

where each R is an independently selected monovalent hydrocarbon group of 1 to 18 carbon atoms that is free of aliphatic unsaturation, and subscript x has a value sufficient to give the polydiorganosiloxane a viscosity of >350 mPa·s to 100,000 mPa·s measured at 25° C. at 0.1 RPM to 50 RPM on a Brookfield DV-III cone & plate viscometer with #CP-52 spindle; and
0 to 4 weight % of (d) a maleated ethylene-based polymer; each based on combined weights of starting materials (a), (b), (c), and (d) in said composition.

(a) Lignocellulosic-Based Filler

The composition described above comprises starting material (a) a lignocellulosic-based filler. The lignocellulosic-based filler comprises, alternatively consists essentially of, alternatively consists of, a lignocellulosic material. Typically, the lignocellulosic-based filler consists of the lignocellulosic material. The lignocellulosic-based filler, as well as the lignocellulosic material, may comprise any matter derived from any plant source. When the lignocellulosic-based filler consists essentially of or consists of lignocellulosic material, the lignocellulosic material may also include some water or moisture content, although the lignocellulosic material, as well as the lignocellulosic-based filler, is typically dry, i.e., does not contain any free moisture content but for that which may be associated with the relative humidity in an environment in which the lignocellulosic-based filler is prepared, derived, formed, and/or stored. The same is typically true for other species of (a) the lignocellulosic-based filler, but is noted in regards to lignocellulosic-based fillers as lignocellulosic materials generally include some water content as harvested/prepared before any drying or end use.

The lignocellulosic-based filler typically comprises carbohydrate polymers (e.g., cellulose and/or hemicellulose), and may further comprise an aromatic polymer (e.g., lignin). The lignocellulosic-based filler is typically a natural lignocellulosic material, i.e., is not synthetically derived. For example, the lignocellulosic-based filler is typically derived from wood (hardwood, softwood, and/or plywood). Alternatively or in addition, the lignocellulosic-based filler may comprise lignocellulosic material from other non-wood sources, such as lignocellulosic material from plants, or other plant-derived polymers, for example agricultural by-products, chaff, sisal, bagasse, wheat straw, kapok, ramie, henequen, corn fiber or coir, nut shells, flax, jute, hemp, kenaf, rice hulls, abaca, peanut hull, bamboo, straw, lignin, starch, or cellulose and cellulose-containing products, and combinations thereof. The lignocellulosic-based filler may be virgin, recycled, or a combination thereof.

Alternatively, the lignocellulosic-based filler may comprise a wood filler. "Wood" is as described in The Chemical Composition of Wood by Pettersen, Roger C., U.S. Department of Agriculture, Forest Service, Forest Products Laboratory, Madison, Wis., Chapter 2. Wood may comprise lignin in an amount of 18% to 35% and carbohydrate in an amount of 65% to 75%, and optionally inorganic minerals in an amount up to 10%. The carbohydrate portion of wood comprises cellulose and hemicellulose. Cellulose content may range from 40% to 50% of the dry wood weight and hemicellulose may range from 25% to 35%. Alpha-cellulose content may be 29% to 57%, alternatively 40% to 50%, based on dry weight of the wood filler. The wood filler is derived from wood, e.g., hardwood and/or softwood. Specific examples of suitable hardwoods from which the wood filler may be derived include, but are not limited to, ash, aspen, cottonwood, basswood, birch, beech, chestnut, gum, elm eucalyptus, maple, oak, poplar, sycamore, and combinations thereof. Specific examples of suitable softwoods from which the wood filler may be derived include, but are not limited to, spruce, fir, hemlock, tamarack, larch, pine, cypress, redwood, and combinations thereof. Fillers derived from combinations of different hardwoods, combinations of different softwoods, or combinations of hardwood(s) and softwood(s) may be used together as the wood filler. Alternatively, the lignocellulosic-based filler may consist essentially of a wood filler. Alternatively, the lignocellulosic-based filler may consist of a wood filler.

The lignocellulosic-based filler may have any form and size, e.g., from nanometer to millimeter particle size. For example, the lignocellulosic-based filler may comprise a powder, a pulp, a flour, sawdust, a fiber, a flake, a chip, a shaving, a strand, a scrim, a wafer, a wool, a straw, a particle, or any combination thereof. The lignocellulosic-based filler may be formed via a variety of techniques known to one of skill in the art, typically as a function of the form thereof. For example, the lignocellulosic-based filler can be prepared by comminuting logs, branches, industrial wood residue, or rough pulpwood. The lignocellulosic-based filler may be comminuted to a desired particle size. For example, the lignocellulosic-based filler may be comminuted with any convenient equipment, such as a hammer mill, which results in the lignocellulosic-based filler having a particle size suitable for use in mixing processes. The desired particle size is typically selected by one of skill in the art based on the particular mixing process utilized and desired properties of the wood plastic composite article. By particle size, it is meant the dimensions of the lignocellulosic-based filler, regardless of shape, and includes, for example, dimensions associated with the lignocellulosic-based filler when in the form of fibers. As known in the art, lignocellulosic-based fillers may be pelletized, or otherwise in the form of pellets, which may substantially maintain shape and dimension when incorporated into the composition or which may form smaller particles in the composition.

The shape and dimensions of the lignocellulosic-based filler is also not specifically restricted. For example, the lignocellulosic-based filler may be spherical, rectangular, ovoid, irregular, and may be in the form of, for example, a powder, a flour, a fiber, a flake, a chip, a shaving, a strand, a scrim, a wafer, a wool, a straw, a particle, and combinations thereof. Dimensions and shape are typically selected based on the type of the lignocellulosic-based filler utilized, the selection of other starting materials included within the WPC composition, and the end use application of the WPC article formed therewith.

Starting material (a) may be one lignocellulosic-based filler or may be a combination of two or more lignocellulosic-based polymers that differ from one another by at least one property such as plant source from which the lignocellulosic-based filler was derived, lignin content, alpha-cellulose content, method of preparation, filler shape, filler surface area, average particle size, and/or particle size distribution. Starting material (a) may be present in the composition in an amount of 15% to 70%, alternatively 45% to 65%, based on combined weights of starting materials (a), (b), (c) and (d).

(b) Ethylene-Based Polymer

The composition described above further comprises starting material (b) an ethylene-based polymer. As used herein, "ethylene-based" polymers are polymers prepared from ethylene monomers as the primary (i.e., greater than 50%) monomer component, though other co-monomers may also be employed. "Polymer" means a macromolecular compound prepared by reacting (i.e., polymerizing) monomers of the same or different type, and includes homopolymers and interpolymers. "Interpolymer" means a polymer prepared by the polymerization of at least two different monomer types. This generic term includes copolymers (usually employed to refer to polymers prepared from two different monomer types), and polymers prepared from more than two different monomer types (e.g., terpolymers (three different monomer types) and tetrapolymers (four different monomer types)).

The ethylene-based polymer can be an ethylene homopolymer. As used herein, "homopolymer" denotes a polymer comprising repeating units derived from a single monomer type, but does not exclude residual amounts of other components used in preparing the homopolymer, such as catalysts, initiators, solvents, and chain transfer agents.

Alternatively, the ethylene-based polymer can be an ethylene/alpha-olefin ("α-olefin") interpolymer having an α-olefin content of at least 1%, alternatively at least 5%, alternatively at least 10%, alternatively at least 15%, alternatively at least 20%, or alternatively at least 25 wt % based on the entire interpolymer weight. These interpolymers can have an α-olefin content of less than 50%, alternatively less than 45%, alternatively less than 40%, or alternatively less than 35% based on the entire interpolymer weight. When an α-olefin is employed, the α-olefin can have 3 to 20 carbon atoms (C3-C20) and be a linear, branched or cyclic α-olefin. Examples of C3-20 α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also have a cyclic structure such as cyclohexane or cyclopentane, resulting in an α-olefin such as 3-cyclohexyl-1-propene (allyl cyclohexane) and vinyl cyclohexane. Illustrative ethylene/α-olefin interpolymers include ethylene/propylene, ethylene/1-butene, ethylene/1-hexene, ethylene/1-octene, ethylene/propylene/1-octene, ethylene/propylene/1-butene, and ethylene/1-butene/1-octene.

Starting material (b) can be one ethylene-based polymer or a combination of two or more ethylene-based polymers (e.g., a blend of two or more ethylene-based polymers that differ from one another by at least one property such as monomer composition, monomer content, catalytic method of preparation, molecular weight, molecular weight distributions, and/or densities). If a blend of ethylene-based polymers is employed, the polymers can be blended by any in-reactor or post-reactor process.

The ethylene-based polymer for starting material (b) may be selected from the group consisting of High Density Polyethylene (HDPE), Medium Density Polyethylene (MDPE), Low Density Polyethylene (LDPE), Linear Low Density Polyethylene (LLDPE), Low Density Low Molecular Weight Polyethylene (LDLMWPE), and a combination thereof.

Alternatively, the ethylene-based polymer can be a LLDPE. LLDPEs are generally ethylene-based polymers having a heterogeneous distribution of comonomer (e.g., α-olefin monomer), and are characterized by short-chain branching. For example, LLDPEs can be copolymers of ethylene and α-olefin monomers, such as those described above. LLDPEs may have densities ranging from 0.91 g/cm$^3$ to 0.94 g/cm$^3$. Densities for the LLDPEs and other ethylene-based polymers described herein are determined by ASTM D792-13. LLDPEs suitable for use herein can have a melt index ($I_2$) of 1 g/10 min to 20 g/10 min, alternatively >2 g/10 min, alternatively 2.3 g/10 min to 20 g/10 min, alternatively 2.3 g/10 min to 12 g/10 min, alternatively 2.3 g/10 min to 6 g/10 min. Values for $I_2$ for LLDPEs and other ethylene-based polymers are determined at 190° C. and 2.16 Kg according to ASTM D1238-13. The LLDPE can have a melting temperature of at least 124° C., alternatively 124° C. to 135° C., and alternatively 124° C. to 132° C. Melting temperatures for LLDPEs and other polyethylene-based polymers are determined by DSC according to ASTM D3418-15.

LLDPE's are known in the art and may be produced by known methods. For example, LLDPE may be made using Ziegler-Natta catalyst systems as well as single-site catalysts such as bis-metallocenes (sometimes referred to as "m-LLDPE"), post-metallocene catalysts, and constrained geometry catalysts. LLDPEs include linear, substantially linear or heterogeneous polyethylene copolymers or homopolymers. LLDPEs may contain less long chain branching than LDPEs, and LLDPEs include: substantially linear ethylene polymers which are further defined in U.S. Pat. Nos. 5,272,236, 5,278,272, and 5,582,923; homogeneously branched linear ethylene polymer compositions such as those in U.S. Pat. No. 3,645,992; and/or heterogeneously branched ethylene polymers such as those prepared according to the process disclosed in U.S. Pat. No. 4,076,698. The LLDPEs can be made via gas-phase, solution-phase or slurry polymerization or any combination thereof, using any type of reactor or reactor configuration known in the art.

Alternatively, the ethylene-based polymer can be a MDPE. MDPEs are ethylene-based polymers having densities generally ranging from 0.926 g/cm$^3$ to 0.940 g/cm$^3$. Alternatively, the MDPE can have a density ranging from 0.930 g/cm$^3$ to 0.939 g/cm$^3$. The MDPE can have $I_2$ of 0.1 g/10 min to 20 g/10 min, alternatively >2 g/10 min, alternatively 2.3 g/10 min to 20 g/10 min, alternatively 2.3 g/10 min to 12 g/10 min, and alternatively 2.3 g/10 min to 6 g/10 min. The MDPE can have a melting temperature of at least 124° C., alternatively 124° C. to 135° C., and alternatively 124° C. to 132° C. MDPE may be made using chromium or Ziegler-Natta catalysts or using metallocene, constrained geometry, or single site catalysts, and typically have MWD greater than 2.5.

Alternatively, the ethylene-based polymer can be a HDPE. HDPEs are ethylene-based polymers having densities of at least 0.940 g/cm$^3$. Alternatively, the HDPE can have a density of >0.940 g/cm$^3$ to 0.970 g/cm$^3$, alternatively >0.940 g/cm$^3$ to 0.965 g/cm$^3$, alternatively >0.940 to 0.952 g/cm$^3$. The HDPE can have a melting temperature of at least 124° C., alternatively 124° C. to 135° C., alternatively 124° C. to 132° C., and alternatively 131° C. to 132° C. The HDPE can have $I_2$ of 0.1 g/10 min to 66 g/10 min, alternatively 0.2 g/10 min to 20 g/10 min, alternatively >2 g/10 min, alternatively 2.3 g/10 min to 20 g/10 min, alternatively 3 g/10 min to 12 g/10 min, alternatively 4 g/10 min to 7 g/10 min. The HDPE can have a PDI of 1.0 to 30.0, alternatively 2.0 to 15.0, as determined by GPC.

The HDPE suitable for use herein can be unimodal. As used herein, "unimodal" denotes an HDPE having a MWD such that its GPC curve exhibits only a single peak with no discernible second peak, or even a shoulder or hump, relative to such single peak. In contrast, "bi-modal" means that the MWD in a GPC curve exhibits the presence of two component polymers, such as by having two peaks or where one component may be indicated by a hump, shoulder, or tail relative to the peak of the other component polymer. The HDPE used herein may be unimodal. HDPEs are known in the art and may be made by known methods. For example, HDPEs may be prepared with Ziegler-Natta catalysts, chrome catalysts or even metallocene catalysts.

Alternatively, the ethylene-based polymer for starting material (b) may be selected from the group consisting of HDPE, MDPE, LLDPE, and a combination thereof. Alternatively, the ethylene-based polymer for starting material (b) may be selected from the group consisting of HDPE, LLDPE, and a combination thereof. Alternatively, the ethylene-based polymer for starting material (b) may be selected from the group consisting of HDPE and LLDPE. Alternatively, the ethylene-based polymer for starting material (b) may be HDPE. Preparation methods for ethylene-based polymers are well known in the art. Any methods known or hereafter discovered for preparing an ethylene-based polymer having the desired properties may be employed for making the ethylene-based polymer. Suitable LLDPEs, MDPEs, and HDPEs may be prepared by methods described above or those disclosed in PCT Publication No. WO2018/049555 and U.S. Patent Application Publication No. 2019/0023895, and the references cited therein. Suitable ethylene-based polymers are commercially available from The Dow Chemical Company of Midland, Mich., USA. Examples of suitable ethylene-based polymers are shown below in Table 1.

TABLE 1

Ethylene-Based Polymers

| Type | Density (g/cm³) | $I_2$ (g/10 min) | Melting Temperature (° C.) |
|---|---|---|---|
| high density polyethylene | 0.950 | 12 | 132 |
| narrow molecular weight distribution high density polyethylene homopolymer | 0.952 | 6.8 | 131 |
| high density polyethylene | 0.952 | 4.4 | 131 |
| high density polyethylene | 0.952 | 10 | 130 |
| high density polyethylene | 0.954 | 20 | 130 |
| high density polyethylene homopolymer | 0.961 | 0.80 | 133 |
| high density polyethylene homopolymer with a narrow molecular weight distribution | 0.965 | 8.3 | 133 |
| ethylene/1-octene linear-low-density polyethylene copolymer | 0.917 | 2.3 | 123 |
| ethylene/1-octene linear-low-density polyethylene copolymer | 0.919 | 6.0 | 124 |
| polyethylene resin, which is a narrow molecular weight distribution copolymer | 0.917 | 25 | 124 |

The ethylene-based polymer for use in the composition may comprise virgin polymer and/or recycled polymer. Without wishing to be bound by theory, it is thought that the ethylene-based polymer may comprise ≥50% recycled polyethylene. The recycled ethylene-based polymer, if utilized, may be sourced from industrial production streams, as well as from post-industrial and/or post-consumer sources. The selection of the specific ethylene-based polymer, as well as any ratio of virgin polymer to recycled polymer, if utilized in concert, is typically a function of cost and desired properties of the WPC article formed therewith.

Starting material (b) may be present in the composition in an amount of 29.5% to 84.5%, alternatively 30% to 60%, alternatively 35% to 55%, and alternatively 40% to 50%, based on combined weights of starting materials (a), (b), (c) and (d).

(c) Polydiorganosiloxane

The composition described above further comprises starting material (c) a polydiorganosiloxane. The polydiorganosiloxane comprises formula

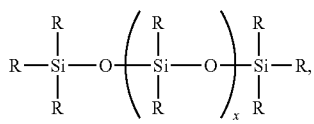

where each R is an independently selected monovalent hydrocarbon group of 1 to 18 carbon atoms that is free of aliphatic unsaturation, and subscript x has a value sufficient to give the polydiorganosiloxane a viscosity of >350 mPa·s to 100,000 mPa·s measured at 25° C. at 0.1 RPM to 50 RPM on a Brookfield DV-III cone & plate viscometer with #CP-52 spindle. One skilled in the art would recognize that rotation rate decreases as viscosity increases and would be able to select the appropriate rotation rate when using this test method to measure viscosity. Alternatively, viscosity may be 1,000 mPa·s to 50,000 mPa·s; alternatively 1,000 mPa·s to 20,000 mPa·s, and alternatively 5,000 mPa·s to 50,000 mPa·s measured as described above. Alternatively, viscosity may be 5,000 mPa·s to 20,000 mPa·s, alternatively 5,000 mPa·s to 15,000 mPa·s, and alternatively 5,000 mPa·s to 12,500 mPa·s, measured according to the test method described above at 5 RPM.

Alternatively, the polydiorganosiloxane may be a trialkylsiloxy terminated polydialkylsiloxane. Alternatively, each R may be an alkyl group of 1 to 18 carbon atoms, alternatively 1 to 12 carbon atoms, alternatively 1 to 6 carbon atoms, and alternatively 1 to 4 carbon atoms. Suitable alkyl groups include methyl, ethyl, propyl (including n-propyl and isopropyl), and butyl (including n-butyl, tert-butyl, sec-butyl, and iso-butyl). Alternatively, each R may be methyl.

Suitable polydiorganosiloxanes may be prepared by methods known in the art such as hydrolysis and condensation of appropriate organohalosilane monomers and/or equilibration of linear and cyclic polyorganosiloxanes optionally with endcapping. The polydiorganosiloxane may be a trimethylsiloxy-terminated polydimethylsiloxane, which is commercially available. Trimethylsiloxy-terminated polydimethylsiloxanes with viscosities of >350 mPa·s to 100,000 mPa·s are commercially available from Dow Silicones Corporation of Midland, Mich., USA.

Starting material (c) may be one polydiorganosiloxane or may be a combination of two or more polydiorganosiloxanes that differ from one another by at least one property such as selection of R groups and viscosity. Starting material (c) may be present in the composition in an amount of 0.5% to 6%, alternatively 1% to 4%, alternatively 0.5% to 3%, alternatively 1% to 2%, and alternatively 2% to 4%, based on combined weights of starting materials (a), (b), (c) and (d).

(d) Maleated Ethylene-Based Polymer

The composition described above may optionally further comprise starting material (d) a maleated ethylene-based polymer. As used herein, the term "maleated" indicates a polymer (e.g., an ethylene-based polymer) that has been modified to incorporate a maleic anhydride monomer. Maleic anhydride can be incorporated into the ethylene-based polymer by any methods known or hereafter discovered in the art. For instance, the maleic anhydride can be copolymerized with ethylene and other monomers (if present) to prepare an interpolymer having maleic anhydride residues incorporated into the polymer backbone. Alternatively, the maleic anhydride can be graft-polymerized to the ethylene-based polymer. Techniques for copolymerizing and graft polymerizing are known in the art.

The maleated ethylene-based polymer may be an ethylene-based polymer having maleic anhydride grafted thereon. The ethylene-based polymer prior to being maleated can be any of the ethylene-based polymers described above, alternatively, the ethylene-based polymer used for maleating may have a melt index lower than that melt index of the ethylene-based polymer described above. The starting ethylene-based polymer can be selected from a linear-low density polyethylene, a medium-density polyethylene, and a high-density polyethylene. Alternatively, the starting ethylene-based polymer can be a high-density polyethylene.

The maleated ethylene-based polymer may have a density of at least 0.923 g/cm³. Alternatively, the maleated ethylene-based polymer can have a density of 0.923 g/cm³ to 0.962 g/cm³, alternatively 0.940 g/cm³ to 0.962 g/cm³, and alternatively 0.923 g/cm³ to 0.940 g/cm³. Density of the maleated ethylene-based polymer may be determined by ASTM D792-13. The maleated ethylene-based polymer may have $I_2$ of 0.1 g/10 min to 25 g/10 min, alternatively 1 g/10 min to 2 g/10 min, alternatively 2 g/10 min to 25 g/10 min, alternatively 2 g/10 min to 12 g/10 min, alternatively 3 g/10 min to 25 g/10 min, and alternatively 3 g/10 min to 12 g/10 min. Values for $I_2$ for maleated ethylene-based polymers are determined at 190° C. and 2.16 Kg according to ASTM D1238-13. The maleated ethylene-based polymer can have a maleic anhydride content of at least 0.25%, alternatively an amount of 0.25% to 2.5%, and alternatively 0.5% to 1.5%, each based on the total weight of the maleated ethylene-based polymer. Maleic anhydride concentrations may be determined by a titration method, which takes dried resin and titrates with 0.02N KOH to determine the amount of maleic anhydride. The dried polymers are titrated by dissolving 0.3 to 0.5 grams of maleated ethylene-based polymer in 150 mL of refluxing xylene. Upon complete dissolution, deionized water (four drops) is added to the solution and the solution is refluxed for 1 hour. Next, 1% thymol blue (a few drops) is added to the solution and the solution is over titrated with 0.02N KOH in ethanol as indicated by the formation of a purple color. The solution is then back-titrated to a yellow endpoint with 0.05N HCl in isopropanol.

Suitable maleated ethylene-based polymers for starting material (d) may be prepared by known methods, such as those disclosed in PCT Publication No. WO2018/049555 and the references cited therein. Alternatively, maleated ethylene-based polymers may be prepared by a process for grafting maleic anhydride on an ethylene-based polymer, which can be initiated by decomposing initiators to form free radicals, including azo-containing compounds, carboxylic peroxyacids and peroxyesters, alkyl hydroperoxides, and dialkyl and diacyl peroxides, among others. Many of these compounds and their properties have been described (Reference: J. Branderup, E. Immergut, E. Grulke, eds. "Polymer Handbook," 4th ed., Wiley, N.Y., 1999, Section II, pp. 1-76.). Alternatively, the species that is formed by the decomposition of the initiator may be an oxygen-based free radical. Alternatively, the initiator may be selected from the group consisting of carboxylic peroxyesters, peroxyketals, dialkyl peroxides, and diacyl peroxides. Exemplary initiators, commonly used to modify the structure of polymers, are listed in U.S. Pat. No. 7,897,689, in the table spanning col. 48 line 13-col. 49 line 29. Alternatively, the grafting process for making maleated ethylene-based polymers can be initiated by free radicals generated by thermal oxidative processes. Suitable maleated ethylene-based polymers are commercially available from The Dow Chemical Company, of Midland, Mich., USA, such as those described below in Table 2.

TABLE 2

Examples of Maleated Ethylene-Based Polymers

| Type | a random ethylene copolymer incorporating a monomer which is classified as being a maleic anhydride equivalent | high density polyethylene grafted with very high maleic anhydride copolymer graft level |
|---|---|---|
| Density (g/cm$^3$) | 0.940 | 0.962 |
| $I_2$ (g/10 min) | 25 | 2.0 |
| Melting Temperature (° C.) | 108 | 130 |

In Table 2, melting temperature of the random ethylene copolymer incorporating a monomer which is classified as being a maleic anhydride equivalent was measured by DSC according to ASTM D3418-15, and melting temperature of the high density polyethylene grafted with very high maleic anhydride copolymer graft level was measured by DSC wherein a film was conditioned at 230° C. for 3 minutes before cooling at a rate of 10° C. per minute to a temperature of −40° C. After the film was kept at −40° C. for 3 minutes, the film was heated to 200° C. at a rate of 10° C. per minute.

Starting material (d) can be one maleated ethylene-based polymer or a combination of two or more maleated ethylene-based polymers (e.g., a blend of two or more maleated ethylene-based polymers that differ from one another by at least one property such as monomer composition, monomer content, catalytic method of preparation, molecular weight, molecular weight distributions, and/or densities). The maleated ethylene-based polymer may be present in the composition in an amount of 0 to 4%. Alternatively, the maleated ethylene-based polymer may be present in an amount of 0 to 2%, alternatively >0% to 2%, alternatively 1% to 3%, and alternatively 1% to 2%, based on combined weights of starting materials (a), (b), (c), and (d).

Additional Starting Materials

The composition described above may optionally further comprise one or more additional starting materials. For example, one or more additional starting materials may be selected from the group consisting of (e) an additional filler which is distinct from the lignocellulosic-based filler of starting material (a), (f) a colorant, (g) a blowing agent, (h) a UV stabilizer, (i) an antioxidant, (j) a process aid, (k) a preservative, (l) a biocide, (m) a flame retardant, (n) an impact modifier, and (o) a combination of two or more of starting materials (e) to (n). Each additional starting material, if utilized, may be present in the composition in an amount of greater than 0 to 30% based on combined weights of all starting materials in the composition. The composition may also include other optional additives, as known in the art. Such additives are described, for example, in Walker, Benjamin M., and Charles P. Rader, eds. Handbook of thermoplastic elastomers. New York: Van Nostrand Reinhold, 1979; Murphy, John, ed. Additives for plastics handbook. Elsevier, 2001.

(e) Additional Filler

The composition may optionally further comprise starting material (e) a filler distinct from the lignocellulosic-filler described above as starting material (a). Specific examples of suitable fillers include, but are not limited to, calcium carbonate, silica, quartz, fused quartz, talc, mica, clay, kaolin, wollastonite, feldspar, aluminum hydroxide, carbon black, and graphite. Alternatively, this filler may be a mineral filler. Alternatively, this filler may be selected from the group consisting of calcium carbonate, talc, and combinations thereof. Suitable fillers are known in the art and are commercially available, e.g., ground silica is sold under the name MIN-U-SIL by U.S. Silica of Berkeley Springs, W. Va., USA. Suitable precipitated calcium carbonates include Winnofil™ SPM from Solvay and Ultra-pflex™ and Ultra-pflex™ 100 from Specialty Minerals, Inc. of Quinnesec, Mich., USA.

The shape and dimensions of the filler is not specifically restricted. For example, the filler may be spherical, rectangular, ovoid, irregular, and may be in the form of, for example, a powder, a flour, a fiber, a flake, a chip, a shaving, a strand, a scrim, a wafer, a wool, a straw, a particle, and combinations thereof. Dimensions and shape are typically selected based on the type of the filler utilized, the selection of other starting materials included within the solid carrier component.

Regardless of the selection of the filler, the filler may be untreated, pretreated, or added in conjunction with an optional filler treating agent, described below, which when so added may treat the filler in situ or before incorporation of the filler in the composition described above. Alternatively, the filler may be surface treated to facilitate wetting or dispersion in the composition, which when so added may treat the filler in situ in the composition.

The filler treating agent may comprise a silane such as an alkoxysilane, an alkoxy-functional oligosiloxane, a cyclic polyorganosiloxane, a hydroxyl-functional oligosiloxane such as a dimethyl siloxane or methyl phenyl siloxane, an organosilicon compound, a stearate, or a fatty acid. The filler treating agent may comprise a single filler treating agent, or a combination of two or more filler treating agents selected from similar or different types of molecules.

The filler treating agent may comprise an alkoxysilane, which may be a mono-alkoxysilane, a di-alkoxysilane, a tri-alkoxysilane, or a tetra-alkoxysilane. Alkoxysilane filler treating agents are exemplified by hexyltrimethoxysilane, octyltriethoxysilane, decyltrimethoxysilane, dodecyltrimethoxysilane, tetradecyltrimethoxysilane, phenyltrimethoxysilane, phenylethyltrimethoxysilane, octadecyltrimethoxysilane, octadecyltriethoxysilane, and a combination thereof. In certain aspects the alkoxysilane(s) may be used in combination with silazanes, which catalyze the less reactive alkoxysilane reaction with surface hydroxyls. Such reactions are typically performed above 100° C. with high shear with the removal of volatile by-products such as ammonia, methanol and water.

Suitable filler treating agents also include alkoxysilyl functional alkylmethyl polysiloxanes, or similar materials where the hydrolyzable group may comprise, for example, silazane, acyloxy or oximo.

Alkoxy-functional oligosiloxanes can also be used as filler treating agents. Alkoxy-functional oligosiloxanes and methods for their preparation are generally known in the art. Other filler treating agents include mono-endcapped alkoxy functional polydiorganosiloxanes, i.e., polyorganosiloxanes having alkoxy functionality at one end.

Alternatively, the filler treating agent can be any of the organosilicon compounds typically used to treat silica fillers. Examples of organosilicon compounds include organochlorosilanes such as methyltrichlorosilane, dimethyldichlorosilane, and trimethyl monochlorosilane; organosiloxanes such as hydroxy-endblocked dimethylsiloxane oligomer, silicon hydride functional siloxanes, hexamethyldisiloxane, and tetramethyldivinyldisiloxane; organosilazanes such as hexamethyldisilazane and hexamethylcyclotrisilazane; and organoalkoxysilanes such as alkylalkoxysilanes with methyl, propyl, n-butyl, i-butyl, n-hexyl, n-octyl, i-octyl, n-decyl, dodecyl, tetradecyl, hexadecyl, or octadecyl substituents. Organoreactive alkoxysilanes can include amino, methacryloxy, vinyl, glycidoxy, epoxycyclohexyl, isocyanurato, isocyanato, mercapto, sulfido, vinyl-benzyl-amino, benzyl-amino, or phenyl-amino substituents. Alternatively, the filler treating agent may comprise an organopolysiloxane. Alternatively, certain filler treating agents, such as chlorosilanes, may be hydrolyzed at the filler surface. Alternatively, the filler treating agent may take advantage of multiple hydrogen bonds, either clustered or dispersed or both, as the method to bond the organosiloxane to the surface of the filler. The organosiloxane capable of hydrogen bonding has an average, per molecule, of at least one silicon-bonded group capable of hydrogen bonding. The group may be selected from: a monovalent organic group having multiple hydroxyl functionalities or a monovalent organic group having at least one amino functional group. Hydrogen bonding may be a primary mode of bonding of the organosiloxane to the filler. The organosiloxane may be incapable of forming covalent bonds with the filler. The organosiloxane capable of hydrogen bonding may be selected from the group consisting of a saccharide-siloxane polymer, an amino-functional organosiloxane, and a combination thereof. Alternatively, the polyorganosiloxane capable of hydrogen bonding may be a saccharide-siloxane polymer.

Alternatively, the filler treating agent may comprise alkylthiols such as octadecyl mercaptan and others, and fatty acids such as oleic acid, stearic acid, titanates, titanate coupling agents, zirconate coupling agents, and a combination thereof. One skilled in the art could optimize a filler treating agent to aid dispersion of the filler without undue experimentation.

Starting material (e) may be one additional filler or a combination of two or more additional fillers that differ from one another by at least one property such as type of filler, method of preparation, treatment or surface chemistry, filler composition, filler shape, filler surface area, average particle size, and/or particle size distribution. The additional filler, when present, may be added to the composition in an amount of >0% to 30%, alternatively 5% to 15%, and alternatively 10% to 15%, based on combined weights of all starting materials in the composition.

When selecting starting materials to include in the composition, there may be overlap between types of starting materials because certain starting materials described herein may have more than one function. For example, (e) the additional filler may be useful as an additional filler and as a colorant, and even as a flame retardant, e.g., carbon black. When selecting starting materials for the composition, the components selected are distinct from one another.

Method of Making

This invention further relates to a method for preparing a wood plastic composite (WPC) article. The method comprises:
(1) combining starting materials comprising
15 weight % to 70 weight % of (a) a lignocellulosic-based filler;
29.5 weight % to 84.5 weight % of (b) an ethylene-based polymer;
0.5 weight % to 6 weight % of (c) a polydiorganosiloxane of formula

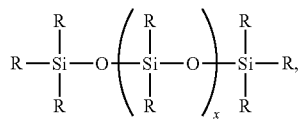

where each R is an independently selected monovalent hydrocarbon group of 1 to 18 carbon atoms that is free of aliphatic unsaturation, and subscript x has a value sufficient to give the polydiorganosiloxane a viscosity of >350 mPa·s to 100,000 mPa·s measured at 25° C. at 0.1 RPM to 50 RPM on a Brookfield DV-III cone & plate viscometer with #CP-52 spindle; and 0 to 4 weight % of (d) a maleated ethylene-based polymer; each based on combined weights of starting materials (a), (b), (c), and (d); thereby preparing a composition; and (2) preparing the WPC article from the composition.

In step (1), the composition is formed by combining at least (a) the lignocellulosic-based filler, (b) the ethylene-based polymer, and (c) the polydiorganosiloxane along with any optional starting materials present in the composition. When (c) the polydiorganosiloxane is in the form of a solid carrier component, the method may comprise combining (a) the lignocellulosic-based filler, (b) the ethylene-based polymer, and the solid carrier component comprising (c) the polydiorganosiloxane.

The starting materials of the composition may be combined in any order and via any suitable manner. For example, (b) the ethylene-based polymer may be melted before, during, and/or after formation of the composition. For example, (b) the ethylene-based polymer may be heated before and/or during combining the starting materials such that (a) the lignocellulosic-based filler and (c) the polydiorganosiloxane are combined with a melted form of (b) the ethylene-based polymer. Starting materials (a) the lignocellulosic-based filler and (c) the polydiorganosiloxane be combined with the melted form of (b) the ethylene-based polymer in any order, e.g., individually, sequentially, together, or simultaneously. Alternatively, however, (b) the ethylene-based polymer may be combined with (a) the lignocellulosic-based filler and (c) the polydiorganosiloxane before heating or melting (b) the ethylene-based polymer such that (b) the ethylene-based polymer is in solid and unmelted or unsoftened form when preparing the composition. Alternatively, (a) the lignocellulosic-based filler and (c) the polydiorganosiloxane may be combined and heated, then added to (b) the ethylene-based polymer in solid or liquid form when preparing the composition.

Starting material (b) the ethylene-based polymer is heated before, during, and/or after formation of the composition to a temperature that is greater than the melting temperature of (b) the ethylene-based polymer, e.g., 10° C. to 90° C., alternatively 10° C. to 40° C., higher than the melting temperature of (b) the ethylene-based polymer. This ensures melting rather than mere softening of (b) the ethylene-based polymer. Alternatively, lower temperatures may be utilized in combination with shear or mixing to ensure softening and/or melting of (b) the ethylene-based polymer.

Starting material (c) the polydiorganosiloxane may be in liquid form or delivered in the form of solid carrier component. The solid carrier component is a solid at room temperature and is a combination comprising (i) the polydiorganosiloxane described above as starting material (c) and (ii) a polymer component selected from the group consisting of an ethylene-based polymer (as described above for starting material (b)), a maleated ethylene-based polymer (as described above for starting material (d)), or a combination of both the ethylene-based polymer and the maleated-ethylene based polymer. The solid carrier component may optionally further comprise a filler, as described below.

Alternatively, (a) the lignocellulosic-based filler and (c) the polydiorganosiloxane and at least one other starting material (e.g., one or more of the additional starting materials (e) to (n) described above) may be combined to give a mixture, and the mixture may be combined with (b) the ethylene-based polymer (and any other additional starting materials) to give the composition. Combining (a) the lignocellulosic-based filler and (c) the polydiorganosiloxane may be referred to as surface treating, wetting, or pre-treating (a) the lignocellulosic-based filler, which may be further to or alternatively to surface treating (a) the lignocellulosic-based filler as set forth herein. Alternatively, (a) the lignocellulosic-based filler and (c) the polydiorganosiloxane may be combined by spraying, impregnation, blending or mixing. Combining (a) the lignocellulosic-based filler and (c) the polydiorganosiloxane may further comprise heating, e.g., to combine (c) the polydiorganosiloxane with (a) the lignocellulosic-based filler. Optionally, the resulting combination of (a) the lignocellulosic-based filler and (c) the polydiorganosiloxane may be compacted before being pelletized to form the pellet if a pellet is utilized. Combining (a) the lignocellulosic-based filler and (c) the polydiorganosiloxane may be performed in a separate process or may be integrated into an existing (e.g., extrusion) process for making a WPC article in a pre-mixing step. In the pre-mixing step, the starting materials may be blended together before feeding into an extruder, e.g., all or a portion of (a) the lignocellulosic-based filler, (c) the polydiorganosiloxane and (b) the ethylene-based polymer and one or more optional starting materials, may be mixed in the pre-mixing step and thereafter fed to an extruder.

Alternatively, (c) the polydiorganosiloxane may be present in a solid carrier component which comprises, alternatively consists essentially of, alternatively consists of: (a) the lignocellulosic-based filler and (c) the polydiorganosiloxane; and the solid carrier component may be heated. Alternatively, this solid carrier component may be heated in a vacuum. This can be performed for multiple reasons, such as to evaporate the carrier vehicle (if any), to evaporate other components present in the mixture used to form the solid carrier component or to improve the mechanical properties of the solid carrier component before using in the method.

The composition may be formed under mixing or shear, e.g., with suitable mixing equipment. For example, the composition may be formed in a vessel equipped with an agitator and/or mixing blades. The vessel may be, for example, an internal mixer, such as a Banbury, Sigma (Z) Blade, or Cavity Transfer style mixer. Alternatively or in addition, the composition may be formed in or processed by an extruder, which may be any extruder, e.g., a single screw extruder with rotational and/or reciprocating (co-kneader) screws, as well as multi-screw devices comprising two or more screws, which may be aligned tangentially or partially/fully intermeshing, revolving in either a co- or counter-rotational direction. Alternatively, a conical extruder may be used for forming the WPC composition described herein.

In the method for preparing the WPC article as described above, the method further comprises forming the WPC article from the composition in step 2). The composition may be prepared, e.g., in the vessel, and subsequently removed from the vessel to form the article with separate equipment. Alternatively, the same equipment may be utilized to prepare the composition and subsequently form the WPC article. For example, the composition may be prepared and/or mixed in an extruder, and the extruder may be utilized to form the WPC article with the composition. Alternatively, the WPC article may be formed via molding, e.g., with an injection, compression, or transfer molding process. The composition may be formed independently and disposed in the mold once formed.

The method described above comprises forming the WPC article from the composition, which may comprise forming the composition into a desired shape. The desired shape depends on end use applications of the WPC article. One of skill in the art understands how dies for extrusion and molds for molding may be selected and created based on the desired shape of the WPC article.

The method may be performed continuously or semi-continuously in an extruder, such as a twin screw extruder (in which the screws are concurrently rotated, partially or fully intermeshing, alternatively counter rotated aligned either tangentially or partially or fully intermeshing). Starting material (c) the polydiorganosiloxane (in liquid state or as part of a solid carrier component) may be disposed in the extruder concurrently with (a) the lignocellulosic-based filler and (b) the ethylene-based polymer. Alternatively, the polydiorganosiloxane may be disposed in the extruder after melting (b) the ethylene-based polymer and before adding (a) the lignocellulosic-based filler. Alternatively, the polydiorganosiloxane may be disposed in the extruder after (a) the lignocellulosic-based filler and (b) the ethylene-based polymer and before the WPC article exits the extruder. Alternatively, (a) the lignocellulosic-based filler may be disposed in the extruder concurrently with the polydiorganosiloxane, where they are heated to effect surface treatment of (a) the lignocellulosic-based filler with (c) the polydiorganosiloxane, then (b) the ethylene-based polymer may be disposed in the extruder to give a mixture and the temperature increased to a temperature suitable for compounding the mixture and forming the WPC article. The extruder may have one or more zones, such as 1 to 3, or 3 to 8, or 1 to 12, zones, where starting materials can be added. The zones may be heated at different temperatures.

Alternatively, (b) the ethylene-based polymer may be disposed in a first zone of the extruder, which is heated at +/−30° C. within the melting temperature of (b) the ethylene-based polymer. Starting material (c) the polydiorganosiloxane, which may be delivered in a solid carrier component, may be disposed in a second or later zone of the extruder, which may be heated at 10° C. to 90° C. above the melting temperature of (b) the ethylene-based polymer. As noted above, the temperature utilized is typically less than a degradation temperature of the starting materials of the composition. Alternatively, the die of the extruder may also be heated, and the temperatures utilized by the extruder, including the temperature of any zone and the die, may be selected such that the temperatures do not exceed a degradation temperature of (a) the lignocellulosic-based filler. The degradation temperature of (a) the lignocellulosic-based filler is contingent on the selection thereof, as understood by one of skill in the art.

The method described above may be used to produce various WPC articles, such as building materials. Such WPC building materials include residential and/or commercial building and construction products and applications, e.g., decking, railing, siding, fencing, window framing, trim, skirts, and flooring. When the building material is decking, the method may optionally further comprise step 3), adding a cap stock layer after step 2).

Solid Carrier Component Composition

As described above, (c) the polydiorganosiloxane may be added to the composition for preparing the WPC article in the form of a solid carrier component. The solid carrier component may comprise, alternatively may consist essentially of, and alternatively may consist of:

5 weight % to 35 weight % of (i) the polydiorganosiloxane described above as starting material (c);

65 weight % to 95 weight % of (ii) a polymer component selected from the group consisting of:
an ethylene-based polymer as described above for starting material (b),
a maleated ethylene-based polymer as described above for starting material (d), and
a combination of both the ethylene-based polymer and the maleated ethylene-based polymer; and
0 to 10% of (iii) a filler.

Starting material (i) the polydiorganosiloxane in the solid carrier component is as described above for starting material (c). Starting material (ii) the polymer component may comprise the ethylene-based polymer and may be free of maleated ethylene-based polymer. The ethylene-based polymer in the solid carrier component is as described above for starting material (b). Alternatively, in the solid carrier component the ethylene-based polymer may be selected from the group consisting of LLDPE, HDPE and a combination thereof, alternatively the ethylene-based polymer in the solid carrier component may be HDPE. The HDPE used in the solid carrier component may have a melt index >2 g/10 min, alternatively 2.3 g/10 min to 20 g/10 min, alternatively 2.3 g/10 min to 12 g/10 min, alternatively 2.3 g/10 min to 6 g/10 min, alternatively 4.4 g/10 min to 20 g/10 min, and alternatively 4.4 g/10 min to 12 g/10 min. Alternatively, (ii) the polymer component may be a maleated-ethylene based polymer, and the solid carrier component may be free of ethylene-based polymer. The maleated ethylene-based polymer for use in the solid carrier component may be as described above for starting material (d). Alternatively, (ii) the polymer component may include both an ethylene-based polymer and a maleated ethylene-based polymer. The filler in the solid carrier component is optional. When present, the filler may comprise a lignocellulosic-based filler as described above for starting material (a), an additional filler, such as a mineral filler, as described above as starting material (e), or a combination of both the lignocellulosic-based filler and the additional filler. Alternatively, the filler in the solid carrier component may be a mineral filler, and alternatively the mineral filler may be selected from the group consisting of talc, calcium carbonate, and a combination thereof. Alternatively, the filler in the solid carrier component may be talc. The solid carrier component may alternatively comprise 10% to 30% of (i) the polydiorganosiloxane, 70% to 90% of (ii) the polymer component, and 0 to 10% of (iii) the filler. Alternatively, the solid carrier component may comprise 10% to <25% of (i) the polydiorganosiloxane, alternatively 10% to 20% of the polydiorganosiloxane. Alternatively, the solid carrier component may contain 0% filler. Alternatively, the solid carrier component may comprise >75% to 90% of (ii) the polymer component, alternatively 80% to 90% of (ii) the polymer component.

The solid carrier component is a solid at ambient temperature and pressure (e.g., 25° C. and 1 atmosphere). The solid carrier component may be formed by combining the starting materials in any order. The solid carrier component may be prepared by forming a mixed composition from (ii) the polymer component and (i) the polydiorganosiloxane, and when present (iii), the filler, by dispersing under mixing or shear, e.g., with suitable mixing equipment. For example, the mixed composition may be dispersed in a vessel equipped with an agitator and/or mixing blades. The vessel may be, for example, an internal mixer, such as a Banbury, Sigma (Z) Blade, or Cavity Transfer style mixer. Alternatively or in addition, the mixed composition may be dispersed in or processed by an extruder, which may be any extruder, e.g., a single screw extruder with rotational and/or reciprocating (co-kneader) screws, as well as multi-screw devices comprising two or more screws, which may be aligned tangentially or partially/fully intermeshing, revolving in either a co- or counter-rotational direction. Alternatively, a conical extruder may be used to disperse the mixed composition described herein.

The solid carrier components prepared as described above are re-processable and may be prepared for feeding in subsequent processes. The mixed composition prepared as described above may be, for example, substantially continuous ribbons or discontinuous pellets or particles or powders. Substantially continuous ribbons can be formed by pressurizing the mixed composition and passing it through a die to create continuous strands or tapes that are subsequently cooled before being suitably packaged. Alternatively, the strand or tape may be comminuted to form pellets or powders. The mixing device may also produce the pressure and/or heat needed to process the mixed composition through the die when the mixing device is an extruder, which may be any extruder, e.g., BUSS kneader, or a single screw extruder with rotational and/or reciprocating (co-kneader) screws, as well as multi-screw devices comprising two or more screws, which may be aligned tangentially or partially/fully intermeshing, revolving in either a co- or counter-rotational direction. A conical extruder may be used for mixing and pressurizing the mixed composition. Alternately, a gear pump may be used to generate the pressure needed for extrusion after the starting materials have been mixed to form the mixed composition. Discontinuous forms of the mixed composition may be created by chopping continuous ribbons of mixed composition into shorter lengths. Alternatively, large pieces of mixed composition may be reduced to usable sizes by use of a grinder or shredder.

The solid carrier component may be formed by a method performed continuously or semi-continuously in an extruder, such as a twin screw extruder (in which the screws are concurrently rotated, partially or fully intermeshing, alternatively counter rotated aligned either tangentially or partially or fully intermeshing). Alternatively, (i) the polydiorganosiloxane may be disposed in the extruder concurrently with the polymer component and optionally (iii) the filler. Alternatively, (i) the polydiorganosiloxane may be disposed in the extruder after melting (ii) the polymer component (and before adding (iii) the filler, if any will be added to the mixed composition). Alternatively, (i) the polydiorganosiloxane may be disposed in the extruder after (iii) the filler, when present, and before (ii) the polymer component, and before the mixed composition exits the extruder. Alternatively, (iii) the filler may be disposed in the extruder concurrently with (i) the polydiorganosiloxane, then the polymer component may be disposed in the extruder to give a mixture and the temperature increased to a temperature suitable for compounding the mixture. The extruder may have one or more zones, such as 1 to 3, alternatively 1 to 12, alternatively 3 to 12, or alternatively 3 to 10 zones, where starting materials can be added. The zones may be heated at different temperatures and incorporate various functional stages including conveying, melting, mixing, deaeration, vacuum, pressurization, and forming.

Alternatively, (ii) the polymer component may be disposed in a first zone of the extruder, which is heated at +/−30° C. within the melting temperature of the polymer component. The (i) polydiorganosiloxane may be disposed in a second zone of the extruder, which is heated at 10° C. to 90° C. above the melting temperature of (ii) the polymer component. Starting material (iii), the filler, when present, is disposed in one or more of the first, second, or subsequent zones of the extruder. As noted above, the temperature utilized is typically less than a degradation temperature of the starting materials of the solid carrier component. The mixture may be stripped to remove any air, moisture or byproducts prior to pressurization and forming in the die of the extruder. The vacuum, pressurization, and forming zones may also be heated, and the temperatures utilized by the extruder, including the temperature of any zone and the die, does not exceed a degradation temperature of starting materials (i), (ii), and, when present (iii),. The degradation temperature of starting materials (i), (ii), and (iii) is contingent on the selection thereof, as understood by one of skill in the art. The resulting extruded strand may be comminuted by any convenient means to form the solid carrier component.

The solid carrier component is typically in particulate form, and may be, for example, in the form of particles, pellets, or powders. An average particle size of the solid carrier component is a function of desired properties and end use thereof. The solid carrier component may be a powder. Alternatively, the solid carrier component may be a pellet. Pellets typically have greater average particle sizes than powders.

EXAMPLES

These examples are intended to illustrate the invention to one skilled in the art and are not to be interpreted as limiting the scope of the invention set forth in the claims. The starting materials in Table 3 were used in these examples.

TABLE 3

| Starting Materials | |
|---|---|
| Material | Description |
| LLDPE | Polyethylene with $I_2$ = 2.3 g/10 min and a density of 0.92 g/cm$^3$ |
| LLDPE 2 | Polyethylene with $I_2$ = 6 g/10 min and a density of 0.919 g/cm$^3$, and a melting temperature of 124° C. |
| HDPE | Polyethylene with $I_2$ = 6.8 g/10 min and a density of 0.952 g/cm$^3$ |
| HDPE 2 | high density polyethylene homopolymer with $I_2$ = 0.8 g/10 min, a density of 0.961 g/cm$^3$, and a melting temperature of 133° C. |
| HDPE 3 | high density polyethylene homopolymer with a narrow molecular weight distribution with $I_2$ = 8.3 g/10 min, a density of 0.965 g/cm$^3$, and melting temperature of 133° C. |
| HDPE 4 | high density polyethylene homopolymer with $I_2$ = 1.5 g/10 min, a density of 0.955 g/cm$^3$, and a melting temperature of 130° C. |
| HDPE 5 | high density polyethylene homopolymer with $I_2$ = 20 g/10 min @ 190/21.6 kg, a density of 0.954 g/cm$^3$, and a melting temperature of 130° C. |
| HDPE 6 | high density polyethylene homopolymer with $I_2$ = 4.4 g/10 min @ 190/2.16 kg, a density of 0.952 g/cm$^3$, and a melting temperature of 131° C. |
| MRF | Talco 0130WNAPC Multicolor flake (high density polyethylene) |
| Si-350 | trimethylsiloxy-terminated polydimethylsiloxane with a viscosity of 350 mPa · s |
| Si-1000 | trimethylsiloxy-terminated polydimethylsiloxane with a viscosity of 1000 mPa · s |
| Si-5000 | trimethylsiloxy-terminated polydimethylsiloxane with a viscosity of 5000 mPa · s |
| Si-12500 | trimethylsiloxy-terminated polydimethylsiloxane with a viscosity of 12500 mPa · s |
| Si-16500 | Blend of 15% trimethylsiloxy-terminated polydimethylsiloxane and 85% bis-hydroxyl-terminated polydimethylsiloxane with a viscosity of 16500 mPa · s |
| Si-60000 | trimethylsiloxy-terminated polydimethylsiloxane with a viscosity of 60000 mPa · s |
| Si-100000 | trimethylsiloxy-terminated polydimethylsiloxane with a viscosity of 100,000 mPa · s |

TABLE 3-continued

Starting Materials

| Material | Description |
|---|---|
| MAPE | high density polyethylene grafted with very high maleic anhydride copolymer graft level with density 0.962 g/cm$^3$ and I$_2$ = 2.0 g/10 min |
| Filler | 40M1 Sixty mesh wood flour purchased from American Wood Fibers composed of primarily hardwoods such as maple, poplar, ash and beech. The hydroscopic nature of wood results in moisture contents of up to 10% despite being dried at the time of milling. To compensate for these variations, the wood content was adjusted in the final formulation for moisture content to result in consistent levels of dried wood for all samples. Moisture was removed from the wood by use of a vacuum vent on the extruder shortly after the introduction of the wood to the polymer system. Using this system the water was removed for uniformly dry pellets at the time of processing. The wood flour consisted of the following particle size distribution:<br>>850 μm: 0-1%<br>425-850 μm: 15-35%<br>250-425 μm: 30-60%<br>180-250 μm: 10-25%<br>150-180 μm: 0-15%<br>Balance Pan 0-23% |

The ethylene-based polymers (PE) and maleated ethylene-based polymer (MAPE) in Table 3 are each commercially available from The Dow Chemical Company of Midland, Mich., USA. In Table 3, densities were measured by ASTM D792-13; I$_2$ values were measured by ASTM D1238-13 at 190° C. and 2.16 Kg load; and Melting Temperatures were measured by DSC, where a film was conditioned at 230° C. for 3 minutes before cooling at a rate of 10° C. per minute to a temperature of −40° C. After the film was kept at −40° C. for 3 minutes, the film was heated to 200° C. at a rate of 10° C. per minute. The polydiorganosiloxanes are each commercially available from Dow Silicones Corporation of Midland, Mich., USA, and their viscosities were measured at 25° C. at 0.1 to 50 RPM on a Brookfield DV-III cone & plate viscometer with #CP-52 spindle.

Reference Example 1—Procedure for Preparing WPC Samples

Compositions for these examples were produced using a twin screw extruder. The composition was processed in the twin screw extruder and made into a granular format by chopping extruded strands. The granular pellets could then be used in subsequent processes.

Starting material (a), the lignocellulosic-based filler, was added independent of (b) the ethylene-based polymer, and (c) the polydiorganosiloxane through a secondary feed system located at a downstream position on the extruder barrel. By mixing of the solids into the blend of fully melted ethylene-based polymer and polydiorganosiloxane, higher filler content samples could be produced than would have been possible with all materials being fed at the same location.

Injection molding was utilized for producing test specimens. Tensile bars were produced and tested in accordance with ASTM D638-14. Each composition was processed with the same conditions for both compounding in the twin screw extruder and injection molding equipment for consistency. For each example, total feed rates, RPM, temperatures, and equipment configurations remained constant for each composition for both the compounding extruders and injection molding equipment.

The parameters associated with extrusion, as well as the average break strength of the wood plastic composite article formed by each example, the strand quality, and color of the final injection molded tensile bars is set forth below in the tables below.

Melt temperature was obtained with a thermocouple hand probe. As this measurement required a level of technique due to the manual method, it was subject to a high level of variation. Experience showed that results could differ by up to 10° C. depending on operator and technique. In the case of these tests, care was taken to use the same operator and technique per system of (a) lignocellulosic-based filler and (b) ethylene-based polymer to minimize this error.

Extruder torque was noted as a relative percent of the extruder maximum torque.

Break strength was measured by producing five samples which were averaged. Testing was performed in accordance with ASTM D638-14.

Color (Y) was also measured to quantify the level of thermal decomposition occurring in the wood filler. The Y-value or the luminance was measure as a gauge of the darkening of the wood plastic composite during processing. Higher values of Y correspond to a lighter brown color of the wood. The Y value was measured using an average of 2 measurements on 5 separate injection molded tensile dog bone samples (average of 10 measurements) using a BYK spectro-guide 45/0 gloss meter with D65 illuminant and 10 observer.

Strand quality was assigned by visually evaluating for melt fracture, ability to maintain strength for pelletization, and roughness.

Comparative Example Compositions are shown in Table 4. Amounts of each starting material are in weight %.

TABLE 4

| Comparative Example | (b) Ethylene-Based Polymer | (c) Polydimethyl-siloxane (PDMS) | PDMS Amount | (d) Compat-ibilizer Amount | (a) Filler Amount |
|---|---|---|---|---|---|
| 1 | LLDPE | None | 0 | 0 | 55 |
| 2 | LLDPE | None | 0 | 2 | 55 |
| 3 | LLDPE | Si-350 | 1 | 2 | 55 |
| 4 | LLDPE | Si-350 | 2 | 2 | 55 |

In Table 4, the balance of each composition was (b) Ethylene-Based Polymer. Comparative Examples 1 and 2 show controls where no polydiorganosiloxane was added. Comparative Examples 3 and 4 show controls where the polydiorganosiloxane selected had a viscosity too low for this application under the conditions tested.

Table 5 shows performance of the samples prepared as shown in Table 4.

TABLE 5

| Comparative Example | Extruder Torque (%) | Melt Temperature (° C.) | Avg. Break Strength (MPa) | Color (Y) | Observations |
|---|---|---|---|---|---|
| 1 | 82 | 245 | 8.2 | 6.7 | die drool, cannot pelletize |
| 2 | 83 | 249 | 27.4 | 4.5 | uneven blending, die surge, smooth to rough strand |

TABLE 5-continued

| Comparative Example | Extruder Torque (%) | Melt Temperature (° C.) | Avg. Break Strength (MPa) | Color (Y) | Observations |
|---|---|---|---|---|---|
| 3 | 51 | NA* | 25.5 | 10.8 | uneven die flow - could not measure melt temp due to surging and solids in stream |
| 4 | 44 | NA* | 24.0 | 10.5 | strand surging at die head/uneven die flow - could not measure temperature |

NA* means not applicable.

Working Example Compositions are shown in Table 6. Amounts of each starting material are in weight %.

TABLE 6

| Working Example | (b) Polymer | (c) PDMS | (c) PDMS Amount | (d) Compatibilizer Amount | (a) Filler Amount |
|---|---|---|---|---|---|
| 1 | HDPE | Si-5000 | 2 | 0 | 55 |
| 2 | HDPE | Si-5000 | 2 | 2 | 55 |
| 3 | LLDPE | Si-5000 | 2 | 0 | 55 |
| 4 | LLDPE | Si-5000 | 2 | 2 | 55 |
| 5 | LLDPE | Si-5000 | 2 | 2 | 65 |
| 6 | LLDPE | Si-5000 | 2 | 2 | 45 |
| 7 | LLDPE | Si-5000 | 1 | 2 | 55 |
| 8 | LLDPE | Si-5000 | 4 | 2 | 55 |
| 9 | LLDPE | Si-1000 | 1 | 2 | 55 |
| 10 | LLDPE | Si-1000 | 2 | 2 | 55 |
| 11 | LLDPE | Si-1000 | 4 | 2 | 55 |
| 12 | LLDPE | Si-60000 | 1 | 2 | 55 |
| 13 | LLDPE | Si-60000 | 2 | 2 | 55 |
| 14 | LLDPE | Si-60000 | 4 | 2 | 55 |
| 15 | LLDPE | Si-5000 | 0.5 | 2 | 55 |
| 16 | LLDPE | Si-5000 | 6 | 2 | 55 |
| 17 | LLDPE | Si-12500 | 1 | 2 | 55 |
| 18 | LLDPE | Si-12500 | 2 | 2 | 55 |
| 19 | LLDPE | Si-12500 | 4 | 2 | 55 |
| 20 | LLDPE | Si-100000 | 1 | 2 | 55 |
| 21 | LLDPE | Si-100000 | 2 | 2 | 55 |
| 22 | LLDPE | Si-100000 | 4 | 2 | 55 |
| 23 | MRF | Si-60000 | 6 | 0 | 55 |
| 24 | MRF | Si -2000 | 0.5 | 0 | 55 |

Starting Material (b) Polymer was the balance of each sample shown in Table 6. Table 7 shows performance of the samples prepared as shown in Table 6.

TABLE 7

| Working Example | Extruder Torque (%) | Melt Temperature (° C.) | Avg. Break Strength (MPa) | Color (Y) | Observations |
|---|---|---|---|---|---|
| 1 | 56 | 216 | 13.9 | 27.4 | good strands |
| 2 | 55 | 214 | 41.1 | 16.8 | good strands, minimal uneven flow |
| 3 | 57 | 214 | 6.7 | 20.4 | good strands |
| 4 | 52 | 212 | 24.7 | 13.6 | good strands, uneven flow |
| 5 | 54 | 212 | 26.7 | 16.3 | good strands, uneven flow |
| 6 | 50 | 215 | 22.0 | 9.4 | good strands, slightly shiny |
| 7 | 63 | 225 | 26.1 | 8.7 | good strands |
| 8 | 42 | 204 | 21.0 | 19.2 | good strands, minimal uneven flow |
| 9 | 56 | 221 | 26.8 | 11.5 | good strands |
| 10 | 45 | 209 | 24.3 | 10.0 | good strands |
| 11 | 39 | 201 | 22.1 | 12.6 | good strands, slightly shiny |
| 12 | 69 | 245 | 25.1 | 9.6 | good strands |
| 13 | 60 | 231 | 24.5 | 14.3 | good strands, minimal uneven flow |
| 14 | 49 | 212 | 21.6 | 15.4 | good strands, minimal uneven flow |
| 15 | 72 | 242 | 27.2 | 7.7 | good strands, minimal uneven flow |
| 16 | 37 | 196 | 20.1 | 14.9 | good strands, uneven flow |
| 17 | 68 | 240 | 24.8 | 14.2 | good strands |
| 18 | 55 | 224 | 23.3 | 9.4 | good strands |
| 19 | 44 | 200 | 20.8 | 15.2 | good strands, uneven flow, some curling and potential unmelts |
| 20 | 72 | 249 | 25.1 | 6.9 | good strands |
| 21 | 63 | 240 | 24.0 | 9.8 | good strands |
| 22 | 52 | 219 | 21.5 | 13.1 | good strands |
| 23 | 49 | 214 | 11.9 | ND | good strands |
| 24 | 64 | 228 | 15.9 | ND | rough strands |

ND = not determined

In this Reference Example A, a solid carrier component in pellet form was produced using a 26 mm twin screw extruder. Starting material (ii) the ethylene-based polymer, and when used, (ii) the maleated ethylene-based polymer, were fed in via the feed throat in the first barrel section. When used, (ii) the filler CaCO3 (Calcium carbonate which was untreated and had an average particle size of 3 μm) was also fed in via the feed throat in the first barrel section. Starting material (i) the polydiorganosiloxane was injected into the fourth of eleven barrel sections onto a screw section with mixing. The resulting composition was pelletized using a Gala underwater pelletizer for consistency and collected for testing. All samples were cooled to room temperature and aged a minimum of 48 hours before any testing.

In this Reference Example B, A solid carrier component in pellet form was produced using a 25 mm twin screw extruder. Starting material (b) the ethylene-based polymer, and when used, (d) the maleated ethylene-based polymer, were fed in via the feed throat in the first barrel section. Starting material (c) the polydiorganosiloxane was injected into the fourth of twelve barrel sections onto a screw section with mixing. The resulting composition was cooled via full immersion water bath and pelletized using a strand pelletizer.

In this Reference Example C, bleed of the polydiorganosiloxane from the pellets prepared in Reference Example A and Reference Example B as described above was evaluated, as follows. Each sample (4 g) was placed into pre-weighed aluminum pans lined with Whatman™ #1 filter paper (5.5 cm diameter) such that the surface of the aluminum pan was covered fully by the filter paper, but the filter paper was not bent. The pellets were evenly spread out across the filter paper in a semi-uniform layer. The samples were left standing at room temperature on the bench or at the said temperature in a convection oven for the Aging Time. After aging, the pellets were left to stand at room temperature for at least 4 hours, and the pellets were placed in a 20 mL scintillation vial. The filter paper was weighed to determine aged filter paper weight. Bleed was determined according to the formula below:

$$\text{Bleed (\%)} = 100 \times \frac{\text{Aged Filter Paper Weight} - \text{Starting Filter Paper Weight}}{\text{Total Pellet Weight} \times \text{Fraction Siloxane in Pellet}}$$

Compositions, aging conditions and polydiorganosiloxane bleed for the pellets prepared according to Reference Example A (25 through 27 & 35) and Reference Example B (28 through 34) and tested according to Reference Example B are reported below in Table 9.

TABLE 9

| Sample | (ii) PE | PE (i) (%) PDMS | PDMS (%) | (ii) MAPE (%) | (iii) CaCO$_3$ (%) | Aging Time (weeks) | Aging Temp (° C.) | % Bleed |
|---|---|---|---|---|---|---|---|---|
| 25 (working) | HDPE 3 | 60 Si-12500 | 20 | 20 | 0 | 2 | 70 | 0.36 |
| 26 (working) | HDPE 3 | 80 Si-12500 | 20 | 0 | 0 | 2 | 70 | 0.31 |
| 27 (working) | HDPE 6 | 40 Si-16500 | 25 | 25 | 10 | 2 | 70 | 0.8 |
| 28 (working) | HDPE 5 | 60 Si-12500 | 20 | 20 | 0 | 2 | 70 | 0 |
| 29 (working) | LLDPE 2 | 95 Si-350 | 5 | 20 | 0 | 2 | 70 | 0 |
| 30 (working) | HDPE | 70 Si-60000 | 30 | 0 | 0 | 2 | 70 | 0.01 |
| 31 (working) | HDPE | 75 Si-60000 | 25 | 0 | 0 | 2 | 70 | 0 |
| 32 (working) | HDPE | 80 Si-60000 | 20 | 0 | 0 | 2 | 70 | 0 |
| 33 (working) | none | 0 Si-12500 | 5 | 95 | 0 | 2 | 70 | 0 |
| 34 (comparative) | HDPE 4 | 60 Si-12500 | 20 | 20 | 0 | 2 | 70 | 4.04 |
| 35 (comparative) | HDPE 2 | 60 Si-12500 | 20 | 20 | 0 | 2 | 70 | 13.2 |

PROBLEM TO BE SOLVED

WPC articles are commonly produced by high shear methods such as extrusion or injection molding. Lignocellulosic-based fillers are used to alter mechanical properties, decrease cost (because these are typically less expensive than the ethylene-based polymers), decrease density, and/or meet end use requirements for various applications. Adding fillers can make the starting materials difficult to process because the filler generally increases the viscosity of the melted ethylene-based polymer. When the starting materials are processed with a high shear method, these fillers can require more work to process resulting in higher temperatures and limited extrusion rates. This increase in temperature and stress can result in thermal or mechanical decomposition of the lignocellulosic-based filler. Similarly, some ethylene-based polymers can suffer from decomposition under the mechanical or thermal stress from processing. This decomposition translates in poor mechanical properties, discoloration, poor aesthetics, and/or other undesirable defects in the WPC article produced. Similarly, such processing difficulties translate in the need for a higher energy input for processing, increased torque, and reduced processing speed. Combined these effects can result in lower output for compounders and/or poor product quality.

INDUSTRIAL APPLICABILITY

The EXAMPLES above show that by adding a polydiorganosiloxane during processing, torque can be substantially reduced. Reducing torque also reduces energy requirements and reduces the melt temperature of the composition. This temperature reduction can enable higher throughputs, improved material properties, higher filler loadings, improve properties of the WPC article, and/or decrease costs associated with producing the WPC article. This reduction in torque, pressure, work, and temperature can also minimize or eliminate process related decomposition of the ethylene-based polymer and/or filler. It has been surprisingly found that this melt temperature reduction (on the order of 5° C. to 30° C., alternatively 10° C. to 20° C.) can be obtained by using a polydiorganosiloxane without silicon bonded groups other than monovalent hydrocarbon groups free of aliphatic unsaturation, e.g., trimethylsiloxy-terminated polydimethylsiloxane.

It has also been found that polydiorganosiloxanes with viscosity greater than 350 mPa·s but less than or equal to 100,000 mPa·s provide one or more of the benefits described above. Working examples 1-22 show that using 0.5% to 6% of polydiorganosiloxane in the composition can significantly reduce torque to values of 39% to 72% with polydiorganosiloxane, as compared to 81% to 82% without polydiorganosiloxane as observed in comparative examples 1 and 2. Additionally, working examples 1 to 11, 13 to 19 and 21 to 22 show melt temperatures below the melt temperatures in comparative examples 1 and 2. Alternatively, the viscosity of the polydiorganosiloxane may be 5,000 mPa·s to 20,000 mPa·s. It was found that for high viscosity siloxanes (i.e., >100,000 mPa·s, alternatively 60,000 mPa·s), the change in melt temperature during extrusion was less significant under the conditions tested in the examples and comparative examples above, making certain high viscosity polydimethylsiloxanes less useful than polydimethylsiloxanes with lower viscosities. Working examples 12 and 20 have lower levels (1%) of higher viscosity 60,000 mPa·s and 100,000 mPa·s, respectively. For lower viscosity polydimethylsiloxanes (e.g., ≤350 mPa·s) under the conditions of the comparative examples above, the low viscosity polydimethylsiloxane may have not adequately distributed through the ethylene-based polymer resulting in the observed surging at the extrusion die in comparative examples 3 and 4.

Additionally, it has also been found that using polydiorganosiloxanes with viscosity greater than 350 mPa·s but less than or equal to 100,000 mPa·s in combination with a wood filler that is a combination of hardwoods such as maple, poplar, ash and beech with typical alpha-cellulose levels of 42-47%, 45%, 40-41%, and 49% and lignin levels of 21-22%, 16%, 26% and 22%, respectively according to results reported by R. C. Pettersen in the book chapter entitled "*The Chemical Composition of Wood*," enable composites to be produced with reduced darkening compared to samples that did not have the additive. The level of lignin in the wood flour is much higher than defined in U.S. Pat. No. 6,743,507; where it was outlined that cellulose pulp fibers were required to contain greater than 80% alpha-cellulose and less than 2% lignin in order to achieve a reduction is discoloration. The color was measured using the Luminance (Y) value of the XYZ scale, which represents a scaled of light to dark (100 being white and 0 being black/no reflected light). The results show that in the absence of the polydiorganosiloxane, the Y value is low (4.5 to 6.7) in comparative examples 1 and 2. However, Y is 6.9 to 27.4 when polydiorganosiloxane is added, with the lowest Y values reflecting lower levels of polydiorganosiloxanes.

The Examples 25 to 27 showed that a solid carrier component could be prepared including a polydiorganosiloxane as described herein. Examples 25 and 26 showed that a solid carrier component with low bleed of the polydiorganosiloxane can be prepared. "Low bleed" means that siloxane migrating out of the solid carrier component is <1.5% after aging at 70° C. for at least 2 weeks, as measured by the test method in Reference Example B. Working Examples 25 and 26 showed that a low bleed solid carrier component could be prepared using 60 weight % to 80 weight % of HDPE, 0 to 20 weight % of a maleated ethylene-based polymer, and up to 20 weight % of a bis-trimethylsiloxy-terminated polydimethylsiloxane to prepare low bleed pellets.

DEFINITIONS AND USAGE OF TERMS

Unless otherwise indicated by the context of the specification: all amounts, ratios, and percentages herein are by weight; the articles 'a', 'an', and 'the' each refer to one or more; and the singular includes the plural. The SUMMARY and ABSTRACT are hereby incorporated by reference. The transitional phrases "comprising", "consisting essentially of", and "consisting of" are used as described in the Manual of Patent Examining Procedure Ninth Edition, Revision 08.2017, Last Revised January 2018 at section §2111.03 I., II., and III. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The abbreviations used herein have the definitions in Table 10.

TABLE 10

Abbreviations

| Abbreviation | Definition |
|---|---|
| ° C. | degrees Celsius |
| cm | centimeters |
| DSC | differential scanning calorimetry |
| g | grams |
| GPC | gel permeation chromatography |
| HDPE | high-density polyethylene |
| Kg | kilograms |
| LLDPE | linear-low-density polyethylene |
| MAPE | maleated ethylene-based polymer |
| MDPE | medium-density polyethylene |
| mg | milligrams |
| min | minutes |
| mL | milliliters |
| mm | millimeters |
| mPa · s | milliPascal · seconds |
| MWD | molecular weight distribution |
| N | normal |
| PDI | polydispersity index |
| PDMS | trimethylsiloxy-terminated polydimethyl siloxane |
| PE | ethylene-based polymer |
| PTFE | polytetrafluoroethylene |
| RPM | revolutions per minute |
| ULDPE | ultra low density polyethylene, which has a density of 0.880 to 0.912 g/cm$^3$, and which may be prepared with Ziegler-Natta catalysts, chrome catalysts, or single-site catalysts including, but not limited to, bis-metallocene catalysts and constrained geometry catalysts |
| μL | microliters |
| μm | micrometers |
| WPC | wood plastic composite |

The following test methods were used to measure properties of the starting materials herein.

Melt indices of ethylene-based polymers and maleated ethylene-based polymers, abbreviated I$_2$ or I2, were measured according to ASTM D1238-13 at 190° C. and at 2.16 Kg loading. Melt index values are reported in g/10 min.

Samples of ethylene-based polymers and maleated ethylene-based polymers were prepared for density measurement according to ASTM D4703. Measurements were made, according to ASTM D792, Method B, within one hour of sample pressing.

Peak melting point (Melting Temperature) of ethylene-based polymers and maleated ethylene-based polymers was determined by DSC, where a film was conditioned at 230° C. for 3 minutes before cooling at a rate of 10° C. per minute to a temperature of −40° C. After the film was kept at −40° C. for 3 minutes, the film was heated to 200° C. at a rate of 10° C. per minute.

"MWD" is defined as the ratio of weight average molecular weight to number average molecular weight ($M_w/M_n$). $M_w$ and $M_n$ are determined according to conventional GPC methods.

Viscosity of each polydiorganosiloxane was measured at 0.1 to 50 RPM on a Brookfield DV-III cone & plate viscometer with #CP-52 spindle. One skilled in the art would recognize that rotation rate decreases as viscosity increases and would be able to select the appropriate rotation rate when using this test method to measure viscosity.

The invention has been described in an illustrative manner, and it is to be understood that the terminology which has been used is intended to be in the nature of words of description rather than of limitation. With respect to any Markush groups relied upon herein for describing particular features or aspects, different, special, and/or unexpected results may be obtained from each member of the respective Markush group independent from all other Markush members. Each member of a Markush group may be relied upon individually and or in combination and provides adequate support for specific embodiments within the scope of the appended claims.

Furthermore, any ranges and subranges relied upon in describing the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range of "1 to 18" may be further delineated into a lower third, i.e., 1 to 6, a middle third, i.e., 7 to 12, and an upper third, i.e., from 13 to 18, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit.

Embodiments of the Invention

In a first embodiment, a composition for preparing a wood plastic composite article comprises:

40 weight % to 70 weight % of (a) a lignocellulosic-based filler;

29 weight % to 59 weight % of (b) an ethylene-based polymer;

1 weight % to 4 weight % of (c) a polydiorganosiloxane of formula

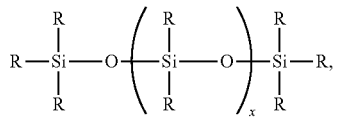

where each R is an independently selected alkyl group of 1 to 18 carbon atoms, and subscript x has a value sufficient to give the polydiorganosiloxane a viscosity of 5,000 mPa·s to 50,000 mPa·s as measured at 25° C. at 0.1 RPM to 50 RPM on a Brookfield DV-III cone & plate viscometer with #CP-52 spindle; and 0 to 4 weight % of (d) a maleated ethylene-based polymer;

each based on combined weights of starting materials (a), (b), (c), and (d) in said composition.

In a second embodiment, in the composition of the first embodiment, starting material (a) the lignocellulosic-based filler comprises a lignocellulosic material derived from wood, plants, agricultural by-products, chaff, sisal, bagasse, wheat straw, kapok, ramie, henequen, corn fiber or coir, nut shells, flax, jute, hemp, kenaf, rice hulls, abaca, peanut hull, bamboo, straw, lignin, starch, or cellulose and cellulose-containing products, and combinations thereof, and starting material (a) is present in an amount of 45 weight % to 65 weight %.

In a third embodiment, in the composition of the first embodiment or the second embodiment, (a) the lignocellulosic-based filler is a wood filler comprising lignin in an amount of 18 weight % to 35 weight % and carbohydrate in an amount of 65 weight % to 75 weight %, and optionally inorganic minerals in an amount up to 10 weight %.

In a fourth embodiment, in the composition of any one of the preceding embodiments, (a) the lignocellulosic-based filler is a wood filler comprising 29 weight % to 57 weight % alpha-cellulose.

In a fifth embodiment, in the composition of any one of the preceding embodiments, starting material (b) the ethylene-based polymer is selected from the group consisting of High Density Polyethylene (HDPE), Medium Density Polyethylene (MDPE), Low Density Polyethylene (LDPE), Linear Low Density Polyethylene (LLDPE), Low Density Low Molecular Weight Polyethylene (LDLMWPE), and a combination thereof, and starting material (b) is present in an amount of 31 weight % to 51 weight %.

In a sixth embodiment, in the composition of any one of the preceding embodiments, (b) the ethylene-based polymer is selected from the group consisting of HDPE, LLDPE, and a combination thereof.

In a seventh embodiment, in the composition of any one of the preceding embodiments, (b) the ethylene-based polymer comprises ≥50% recycled polyethylene.

In an eighth embodiment, in the composition of any one of the preceding embodiments, in starting material (c) the polydiorganosiloxane, each R is an alkyl group of 1 to 12 carbon atoms, subscript x has a value sufficient to give the polydiorganosiloxane a viscosity of 5,000 mPa·s to 20,000 mPa·s, and starting material (c) is present in an amount of 1 weight % to 2 weight %.

In a ninth embodiment, in the composition of any one of the preceding embodiments, in starting material (c) the polydiorganosiloxane each R is an alkyl group of 1 to 6 carbon atoms, and subscript x has a value sufficient to give the polydiorganosiloxane a viscosity of 5,000 mPa·s to 15,000 mPa·s.

In a tenth embodiment, in the composition of any one of the preceding embodiments, starting material (c) is a trimethylsiloxy-terminated polydimethylsiloxane.

In an eleventh embodiment, in the composition of any one of the preceding embodiments, starting material (d) the maleated ethylene-based polymer is present and starting material (d) has a melt index of 2 g/10 min to 25 g/10 min measured according to ASTM D1238-13 at 190° C. and 2.16 Kg and a maleic anhydride content of 0.25 weight % to 2.5 weight %.

In a twelfth embodiment, in the composition of any one of the preceding embodiments, the composition further comprises an additional starting material selected from the group consisting of (e) an additional filler which is distinct from the lignocellulosic-based filler of starting material (a), (f) a colorant, (g) a blowing agent, (h) a UV stabilizer, (i) an antioxidant, (j) a process aid, (k) a preservative, (l) a biocide, (m) a flame retardant, (n) an impact modifier, and (o) a combination of two or more of (e) to (n).

In a thirteenth embodiment, in the composition of any one of the preceding embodiments, starting material (e) the additional filler is present in an amount of 10 weight % to 15 weight %, and starting material (e) is a mineral filler.

In a fourteenth embodiment, a method for preparing a wood plastic composite article comprises:

(1) preparing the composition of any one of the preceding claims by combining the starting materials; and (2) forming the wood plastic composite article from the composition.

In a fifteenth embodiment, the method of the fourteenth embodiment further comprises (i) mixing (a) the lignocellulosic based filler and (b) the ethylene-based polymer before adding (c) the polydiorganosiloxane; (ii) heating (b) the ethylene-based polymer to melt (b) the ethylene-based polymer before and/or during forming the composition; (iii) mixing a mixture of (a) the lignocellulosic-based filler and (c) the polydiorganosiloxane before adding (b) the ethylene-based polymer or (iv) any combination of (ii) and (i) or (iii).

In a sixteenth embodiment, the method of the fourteenth embodiment further comprises: (i) (c) the polydiorganosiloxane is a liquid when combining (c) the polydiorganosiloxane with another starting material of the composition; or (ii) (c) the polydiorganosiloxane is present within a solid carrier component, and the method further comprises melting the solid carrier component when combining (c) the polydiorganosiloxane with another starting material of the composition.

In a seventeenth embodiment, the method of any one of the fourteenth to sixteenth embodiments further comprises: (i) forming the wood plastic composite article from the composition further comprises forming the composition into a desired shape; (ii) forming the wood plastic composite article from the composition comprises extruding the composition; (iii) forming the wood plastic composite article from the composition comprises molding the composition; or (iv) any combinations of (i) to (iii).

In an eighteenth embodiment, the method of any one of the fourteenth to seventeenth embodiments further comprises that the wood plastic composite article is useful as a building material selected from the group consisting of decking, railing, fencing, siding, trim, skirts, and window framing.

In a nineteenth embodiment, the building material of the method of the eighteenth embodiment is decking and the method further comprises: 3) adding a cap stock layer to the decking after step 2).

In a twentieth embodiment, a solid carrier component comprises:
10 weight % to 30 weight % of (i) a polydiorganosiloxane of formula

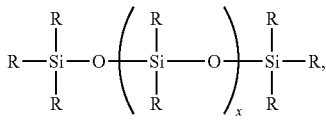

where each R is an independently selected alkyl of 1 to 18 carbon atoms, and subscript x has a value sufficient to give the polydiorganosiloxane a viscosity of 5,000 mPa·s to 50,000 mPa·s measured at 25° C. at 0.1 RPM to 50 RPM on a Brookfield DV-III cone & plate viscometer with #CP-52 spindle; and
70 weight % to 90 weight % of (ii) a polymer component selected from the group consisting of:
an ethylene-based polymer,
a maleated ethylene-based polymer, and
a combination of both (b) and (d); and
0 to 10% of (iii) a filler.

In a twenty-first embodiment, where in the polydiorganosiloxane in the solid carrier component of the twentieth embodiment each R is an alkyl group of 1 to 12 carbon atoms, subscript x has a value sufficient to give the polydiorganosiloxane a viscosity of 5,000 mPa·s to 20,000 mPa·s, and the polydiorganosiloxane is present in an amount of 15 weight % to 25 weight % based on combined weights of all starting materials in the solid carrier component.

In a twenty-second embodiment, the polydiorganosiloxane in the solid carrier component of the twentieth embodiment or the twenty-first embodiment has each R is an alkyl group of 1 to 6 carbon atoms, and subscript x has a value sufficient to give the polydiorganosiloxane a viscosity of 5,000 mPa·s to 15,000 mPa·s, and the polydiorganosiloxane is present in an amount of 18 weight % to 22 weight % based on combined weights of all starting materials in the solid carrier component.

In a twenty-third embodiment, the polydiorganosiloxane in the solid carrier component of any one of the twentieth to twenty-second embodiments is a trimethylsiloxy-terminated polydimethylsiloxane.

In a twenty-fourth embodiment, the polymer component in the solid carrier component of any one of the twentieth to twenty-third embodiments comprises the ethylene-based polymer.

In a twenty-fifth embodiment, the polymer component in the solid carrier component of any one of the twentieth to twenty-fourth embodiments comprises high density polyethylene.

In a twenty-sixth embodiment, the polymer component in the solid carrier component in any one of the twentieth to twenty-fifth embodiments comprises high density polyethylene with a melt index of 2.3 g/10 min to 20 g/10 min.

In a twenty-seventh embodiment, the polymer component in any one of the twentieth to twenty-sixth embodiments further comprises the maleated ethylene-based polymer.

In a twenty-eighth embodiment, the polymer component in any one of the twentieth to twenty-sixth embodiments does not include the maleated ethylene-based polymer.

In a twenty-ninth embodiment, the polymer component in any one of the twentieth to twenty-third embodiments comprises the maleated ethylene-based polymer and does not include the ethylene-based polymer.

In a thirtieth embodiment, the filler is present in the solid carrier component in any one of the twentieth to twenty-ninth embodiments, and the filler comprises talc.

The invention claimed is:

1. A composition for preparing a wood plastic composite article, said composition comprising:
45 weight % to 65 weight % of (a) a lignocellulosic-based filler;
35 weight % to 55 weight % of (b) an ethylene-based polymer;
0.5 weight % to 6 weight % of (c) a polydiorganosiloxane of formula

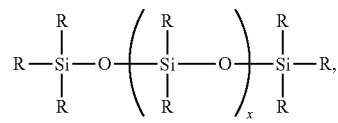

where each R is an independently selected monovalent hydrocarbon group of 1 to 18 carbon atoms that is free of aliphatic unsaturation, and subscript x has a value sufficient to give the polydiorganosiloxane a viscosity of >350 mPa·s to 100,000 mPa·s measured at 25 ° C. at 0.1 RPM to 50 RPM on a Brookfield DY-III cone & plate viscometer with #CP-52 spindle;
0 to 4 weight % of (d) a maleated ethylene-based polymer; and
>0 to 30 weight % of (e) a mineral filler;

each based on combined weights of starting materials (a), (b), (c), and (d) in said composition.

2. The composition of claim 1, where the composition comprises 0.5 weight % to 3 weight % of (c) the polydiorganosiloxane.

3. The composition of claim 1, where (c) the polydiorganosiloxane has viscosity of 1,000 mPa·s to 50,000 mPa·s.

4. The composition of claim 1, where (c) the polydiorganosiloxane has viscosity of 1,000 mPa·s to 20,000 mPa·s.

5. The composition of claim 1, where (c) the polydiorganosiloxane has viscosity of 5,000 mPa·s to 12,500 mPa·s.

6. The composition of claim 1, where (c) the polydiorganosiloxane is a trialkylsiloxy-terminated polydialkylsiloxane.

7. The composition of claim 1, where in (c) the polydiorganosiloxane, each R is methyl.

8. The composition of claim where the mineral filler is selected from the group consisting of calcium carbonate, talc, and combinations thereof.

9. A method for preparing a wood plastic composite article, said method comprising:
(1) combining starting materials comprising
45 weight % to 65 weight % of (a) a lignocellulosic-based filler;
35 weight % to 55 weight % of (b) an ethylene-based polymer;
0.5 weight % to 6 weight % of (c) a polydiorganosiloxane of formula $$R-\underset{\underset{R}{|}}{\overset{\overset{R}{|}}{Si}}-O\left(\underset{\underset{R}{|}}{\overset{\overset{R}{|}}{Si}}-O\right)_x\underset{\underset{R}{|}}{\overset{\overset{R}{|}}{Si}}-R,$$

where each R is an independently selected monovalent hydrocarbon group of 1 to 18 carbon atoms that is free of aliphatic unsaturation, and subscript x has a value sufficient to give the polydiorganosiloxane a viscosity of >350 mPa·s to <100,000 mPa·s measured at 25° C. at 0.1 RPM to 50 RPM on a Brookfield DY-III cone & plate viscometer with #CP-52 spindle; and
0 to 4 weight % of (d) a maleated ethylene-based polymer;
>0 to 30 weight % of (e) a mineral filler;
each based on combined weights of starting materials (a), (b), (c), and (d);
thereby preparing a composition; and
(2) forming the wood plastic composite article from the composition.

10. The method of claim 9, where (c) the polydiorganosiloxane has viscosity of 1,000 mPa·s to 50,000 mPa·s.

11. The method of claim 9, where (c) the polydiorganosiloxane has viscosity of 1,000 mPa·s to 20,000 mPa·s.

12. The method of claim 9, where (c) the polydiorganosiloxane has viscosity of 5,000 mPa·s to 12,500 mPa·s.

13. The method of claim 9, where (c) the polydiorganosiloxane is a trialkylsiloxy-terminated polydialkylsiloxane.

14. The method of claim 9, where in (c) the polydiorganosiloxane, each R is methyl.

15. The method of claim 9, wherein: (i) preparing the wood plastic composite article from the composition further comprises forming the composition into a desired shape; (ii) preparing the wood plastic composite article from the composition comprises extruding the composition; (iii) preparing the wood plastic composite article from the composition comprises molding the composition; or (iv) any combinations of (i) to (iii).

16. The method of claim 9, where the wood plastic composite article is useful as a building material selected from the group consisting of decking, railing, fencing, siding, trim, skirts, and window framing.

17. The method of claim 16, where the building material is decking.

18. The method of claim 17, where the method further comprises: 3) adding a cap stock layer after step 2).

19. The composition of claim 1, where (c) the polydiorganosiloxane has viscosity of 5,000 mPa·s to 50,000 mPa·s.

20. The composition of claim 1, where (c) the polydiorganosiloxane has viscosity of 2,000 mPa·s to 60,000 mPa·s.

* * * * *

UNITED STATES PATENT AND TRADEMARK OFFICE
CERTIFICATE OF CORRECTION

PATENT NO. : 11,820,898 B2
APPLICATION NO. : 18/052711
DATED : November 21, 2023
INVENTOR(S) : Mecca et al.

Page 1 of 1

It is certified that error appears in the above-identified patent and that said Letters Patent is hereby corrected as shown below:

In the Claims

In Claim 1, Column 30, Line 63, the reference to 'DY-III' should read -- DV-III --

In Claim 8, Column 31, Line 18, the claim reference should read -- 1 --

In Claim 9, Column 32, Line 2, the reference to 'DY-III' should read -- DV-III --

Signed and Sealed this
Twenty-sixth Day of March, 2024

Katherine Kelly Vidal
*Director of the United States Patent and Trademark Office*